United States Patent
Sudo et al.

(10) Patent No.: US 8,276,402 B2
(45) Date of Patent: Oct. 2, 2012

(54) METHOD AND APPARATUS FOR MANUFACTURING VITREOUS SILICA CRUCIBLE

(75) Inventors: Toshiaki Sudo, Akita (JP); Hiroshi Kishi, Akita (JP); Kouta Hasebe, Akita (JP)

(73) Assignee: Japan Super Quartz Corporation, Akita (JP)

( * ) Notice: Subject to any disclaimer, the term of this patent is extended or adjusted under 35 U.S.C. 154(b) by 0 days.

(21) Appl. No.: 13/095,431

(22) Filed: Apr. 27, 2011

(65) Prior Publication Data

US 2011/0197631 A1    Aug. 18, 2011

(51) Int. Cl.
*C03B 19/06* (2006.01)
*C03B 19/09* (2006.01)
*C03B 20/00* (2006.01)

(52) U.S. Cl. ............................. 65/17.4; 65/17.3; 65/17.6
(58) Field of Classification Search .......... 65/21.1–21.5, 65/144, 17.3–17.6
See application file for complete search history.

(56) References Cited

U.S. PATENT DOCUMENTS

| | | | | |
|---|---|---|---|---|
| 4,759,787 A * | 7/1988 | Winterburn | ..................... | 65/30.1 |
| 4,935,046 A * | 6/1990 | Uchikawa et al. | ............. | 65/17.4 |
| 4,956,208 A * | 9/1990 | Uchikawa et al. | ........... | 428/34.6 |
| 6,548,131 B1 * | 4/2003 | Fabian et al. | ................ | 428/34.4 |
| 7,350,378 B2 * | 4/2008 | Leist et al. | ...................... | 65/17.3 |
| 2004/0050099 A1 * | 3/2004 | Fukui et al. | ..................... | 65/17.6 |
| 2009/0173276 A1 * | 7/2009 | Satou | ........................... | 117/208 |
| 2010/0170298 A1 * | 7/2010 | Fukui et al. | ...................... | 65/144 |
| 2010/0229599 A1 * | 9/2010 | Fujita et al. | ..................... | 65/33.9 |
| 2010/0236473 A1 * | 9/2010 | Kishi | ............................. | 117/208 |
| 2010/0244311 A1 * | 9/2010 | Kishi et al. | ..................... | 264/219 |
| 2010/0319608 A1 * | 12/2010 | Kanda | .............................. | 117/13 |

FOREIGN PATENT DOCUMENTS

| | | |
|---|---|---|
| JP | 06-191986 A | 7/1994 |
| JP | 10-025184 A | 1/1998 |
| JP | 2000264776 A * | 9/2000 |

OTHER PUBLICATIONS

JP,2000-264776 machine translation as provided by: http://dossier1.ipdl.inpit.go.jp/AIPN/odse_call_transl.ipdl?N0000=7413&NO005=Ei7BzenZVnBvfz7D1ZIK&N0120=01&N2001=2&N3001=2000-264776&Ntt3=chemistryV14&Ntt4=physicalV14&Ntt5=productsV14&Ntt6=&Ntt7=&Ntt8=&Ntt9=&Ntt10=&Ntt11=&Ntt12= on Mar. 2, 2012.*

* cited by examiner

*Primary Examiner* — Matthew Daniels
*Assistant Examiner* — Jodi C Franklin
(74) *Attorney, Agent, or Firm* — Law Office of Katsuhiro Arai

(57) ABSTRACT

Provided is a method of manufacturing a vitreous silica crucible, including: an arc fusing process for fusing the silica powder molded body by using arc flames generated from the plurality of carbon electrodes, wherein the arc fusing process is performed in a state of disposing tips of at least a pair of carbon electrodes of the plurality of carbon electrodes closer to a target surface of the silica powder molded body than other carbon electrode tips, and setting distances from each of the tips of the closer carbon electrodes to the target surface, to be equal, and the arc fusing process is performed by heating and fusing the silica powder molded body while performing fire polishing, which partially removes an inner surface of the silica powder molded body by using arc flames generated by the closer carbon electrodes.

4 Claims, 10 Drawing Sheets

METHOD AND APPARATUS FOR MANUFACTURING VITREOUS SILICA CRUCIBLE

BACKGROUND OF THE INVENTION

1. Field of the Invention

The present invention relates to a method and apparatus for manufacturing a vitreous silica crucible used to pull up silicon single crystal, and more particularly, to a method and apparatus for manufacturing a vitreous silica crucible having excellent inner surface properties.

2. Description of Related Art

A Czochralski method (CZ method) using a vitreous silica crucible is employed in the manufacture of silicon single crystal. Such a method includes immersing a seed crystal in a silicon melt in the vitreous silica crucible and manufacturing a single crystal by gradually pulling up the seed crystal, at a high temperature, wherein a high purity vitreous silica crucible for holding the silicon melt is used.

The vitreous silica crucible used to pull up single crystalline silicon is mainly manufactured by using an arc fusing method. The method (rotation molding method) is used to manufacture the vitreous silica crucible by forming silica powder molded body due to depositing a raw material powder, such as silica or the like, to a predetermined thickness on an inner surface of a rotation mold formed of carbon or metal, and vitrifying the silica powder by heating and fusing the silica powder due to an arc discharge of an electrode installed at an inner upper part of the mold.

The vitreous silica crucible has a two-layered structure consisting of an outer layer (bubble layer) including at least a plurality of bubbles, and a transparent inner layer (transparent layer). A method of fusing the silica powder while depressurizing and removing gas from the silica powder molded body by sucking up the silica powder molded body from the mold side so as to remove bubbles of an interior to be a glass layer is known as a method of manufacturing such a vitreous silica crucible (JP-A-Nos hei 6-191986, and hei 10-025184). In order to depressurize and remove gas from the silica powder molded body (this is called vacuum suction) during the fusing process, a vacuum level inside the silica powder molded body is increased by forming a thin glass layer (hereinafter, referred to as a seal layer) on a surface by uniformly and thinly fusing the inner surface of the silica powder molded body, thereby sealing the inner surface of the silica powder molded body.

Also, recently, based on requests for efficient device processes, or the like, a diameter of a manufactured wafer has increased to exceed 300 mm, and thus a pulling up time has increased. When the pulling up time increases such that a temperature exceeds 1400° C., a vitreous silica crucible capable of pulling up a single crystal having a large diameter by enduring about 100 hours is required. Also, based on demand for minute devices, or the like, properties of a crucible, such as an inner surface state of the vitreous silica crucible, which directly affect properties of a pulled up single crystal, such as controllability of an oxygen index (Oi), a single crystallization rate, or the like, strongly need to be improved.

SUMMARY OF THE INVENTION

However, as described above, although the method of manufacturing a vitreous silica crucible according to the rotation molding method depressurizes the silica powder molded body by forming the seal layer by almost uniformly and thinly fusing the inner surface of the silica powder molded body and then increasing the vacuum level and removing a gas, so as to remove the bubbles from the glass layer, since the seal layer is fused before an inner surface of the crucible is sealed, the seal layer includes lots of bubbles instead of being in a low bubble state sufficient to pull up the single crystal. Also, the seal layer includes impurities, or the like, that are contained before fusion or adhered after the fusion.

When the bubbles or the impurities exist in the inner surface of the vitreous silica crucible, the impurities accelerate formation of cristobalite in the inner surface of the vitreous silica crucible during a process for pulling up crystal of a silica crucible, and thus cristobalite in a spot shape is formed. The cristobalite formed as above is detached from the crucible and falls into the silicon melt, thereby adversely affecting growth of the pulled up single crystal, for example, deteriorating the single crystallization rate. Also, the formation and detachment of the cristobalite are uncontrollable.

To solve the above problems, the present invention provides a method and apparatus for manufacturing a vitreous silica crucible that has few bubbles or impurities in an inner surface of a crucible and is capable of achieving a high crystallization rate of silicon single crystal.

According to an aspect of the present invention, there is provided a method of manufacturing a vitreous silica crucible by using a rotation molding method that molds silica powder molded body by using raw silica powder in a rotating mold, and heats and fuses the silica powder molded body by using an arc discharge through a plurality of carbon electrodes, the method including: a silica powder supplying process for forming the silica powder molded body having a crucible shape by supplying the raw silica powder inside the mold; and an arc fusing process for fusing the silica powder molded body by using arc flames generated from the plurality of carbon electrodes, wherein the arc fusing process is performed in a state of disposing tips of at least a pair of carbon electrodes of the plurality of carbon electrodes (hereinafter, referred to as "closer carbon electrodes") closer to a target surface (a surface to be fused) of the silica powder molded body than other carbon electrode tips, and setting distances from each of the tips of the closer carbon electrodes to the target surface, to be equal, and the arc fusing process is performed by heating and fusing the silica powder molded body while performing fire polishing, which partially removes an inner surface of the silica powder molded body by using arc flames generated by the closer carbon electrodes.

The arc fusing process may performed in a state of disposing, in a plan view, all carbon electrode tips inside a fan-shaped region formed by lines connecting a bottom center of the silica powder molded body and each of the tips of the closer carbon electrodes, a circular arc that passes through the tips of the closer carbon electrodes, and a circular arc that passes through a tip of an innermost carbon electrode.

Preferably, relationships of R1/R=30% to 98%, R2/R=15% to 98%, and aspect ratio indicated by D/R1=0.08 to 0.98 are satisfied, wherein R1 is a distance from a bottom center of the silica powder molded body to an outer circular arc of the fan-shaped region, R2 is a distance from the bottom center of the silica powder molded body to an inner circular arc of the fan-shaped region, R is a distance from the bottom center to an inner-circumferential wall of the silica powder molded body, and D is an interelectrode distance of the closer carbon electrodes.

Preferably, relationships of R1/R=30% to 98%, H/H2=1% to 130%, and θ1=2° to 60° are satisfied, wherein H is a height direction distance of the tips of the closer carbon electrodes in a central axial direction of the silica powder molded body, θ1 is a relative angle between a mold rotation axis of the silica powder molded body and the central axis of the closer carbon electrodes, H2 is a height of the silica powder molded body, and R is a distance from a bottom center of the silica powder molded body to an inner-circumferential wall.

A relative angle of the central axis of each of the closer carbon electrodes with respect to the mold rotation axis may be set in a range from 0 to 60°.

A distance between the tips of the closer carbon electrodes and the target surface may be in a range from 5 to 260 mm.

According to another aspect of the present invention, there is provided an apparatus for manufacturing a vitreous silica crucible, wherein a vitreous silica crucible is manufactured by using a rotation molding method that molds raw silica powder in a mold for crucible molding, and heats and fuses a molded body thereof by using an arc discharge through a plurality of carbon electrodes, according to the above mentioned method, the apparatus including: a mold for supplying and molding the raw silica powder; an arc discharging unit including a plurality of carbon electrodes and a power supplying unit; and an electrode position setting unit disposing at least a pair of carbon electrodes of the plurality of carbon electrodes closer to an inner surface of the silica powder molded body than other carbon electrodes, wherein an arc fusing process that fuses the silica powder molded body is performable by using arc flames generated by the plurality of carbon electrodes, and a fire polishing process that partially removes an inner surface of the silica powder molded body is performable by using arc flames generated by the closer carbon electrodes during the arc fusing process.

The electrode position setting unit may include a function of heating and fusing the silica powder molded body, while maintaining a state of disposing, in a plan view, all carbon electrode tips inside a fan-shaped region formed by lines connecting a bottom center of the silica powder molded body and each of the tips of the closer carbon electrodes, a circular arc that passes through the tips of the closer carbon electrodes, and a circular arc that passes through a tip of an innermost carbon electrode.

The electrode position setting unit may be capable of setting a relative angle between the central axis of each of the pair of the closer carbon electrodes with respect to the mold rotation axis, to be in a range from 0 to 60°.

The apparatus may further include a mold position setting unit capable of controlling a horizontal direction position and angle of a mold rotation central line constituting a rotation axis of the mold, and a height of the mold.

A position of each carbon electrode tip may be settable by using any one or both of the electrode position setting unit and the mold position setting unit.

A distance between each carbon electrode tip and the target surface may be settable in a range from 5 to 260 mm.

The method of manufacturing a vitreous silica crucible by using a rotation molding method that molds silica powder molded body by using raw silica powder in a rotating mold, and heats and fuses the silica powder molded body by using an arc discharge through a plurality of carbon electrodes, the method includes: a silica powder supplying process for forming the silica powder molded body having a crucible shape by supplying the raw silica powder inside the mold; and an arc fusing process for fusing the silica powder molded body by using arc flames generated from the plurality of carbon electrodes, wherein the arc fusing process is performed in a state of disposing tips of at least a pair of carbon electrodes of the plurality of carbon electrodes closer to a target surface (a surface to be fused) of the silica powder molded body than other carbon electrode tips, and setting distances from each of the tips of the closer carbon electrodes to the target surface, to be equal, and the arc fusing process is performed by heating and fusing the silica powder molded body while performing fire polishing, which partially removes an inner surface of the silica powder molded body by using arc flames generated by the closer carbon electrodes. Accordingly, the fused inner surface of the silica powder molded body, which constitutes a seal layer, is evaporated by using high temperature arc flames and bubbles or impurities remaining on a seal layer of an inner surface of a vitreous silica crucible are removed via the fire polishing process, and thus the vitreous silica crucible in which a seal layer is of good quality may be obtained, thereby improving crucible properties.

Here, the improvable crucible properties mean factors affecting characteristics of a semiconductor single crystal pulled up from the vitreous silica crucible, such as a vitrification state of the crucible inner surface, bubble distribution and bubble sizes in a thickness direction, impurity distribution, unevenness of a surface, and a uniform distribution state in a crucible height direction, etc.

Also, if the fire polishing process and an arc fusing process are simultaneously performed, it is possible to reduce an operation time compared to when the fire polishing process and the arc fusing process are separately performed, to reduce manufacturing costs by reducing required supply power, and to increase a thickness of a fused layer while maintaining a sealing state. Accordingly, it is possible to control content amount of bubbles and sizes of bubbles to a desired state while removing impurities or the like existing near a surface.

Alternatively, if the fire polishing process and the arc fusing process are separately performed, it is possible to more precisely control a surface removal state during fire polishing and control a fusing state (including bubble distribution etc.) during the fusing process.

Also, the meaning of performing the fire polishing process after the arc fusing process or at the same time as the arc fusing process is that the fire polishing process constituting a process of reducing a fusing thickness is performed separately from or simultaneously with the arc fusing process constituting a process of increasing the fusing thickness. It is possible to simultaneously perform the fire polishing process and the arc fusing process when the fusing thickness is large.

Also, since the fire polishing process is performed within a 10 to 90% time range of the total arc time, it is possible to set a removal thickness that is a thickness of the surface to be removed from the target surface by setting a fire polishing time, and thus it is possible to set a bubble existing state or an impurity removal state within a predetermined range.

Also, according to the present invention, a carbon electrode position is set in such a way that distances between adjacent carbon electrode tips of the plurality of carbon electrodes are equal, and thus it is possible to generate stable arc flames. Thus, the crucible inner surface has uniform characteristics.

Preferably, relationships of R1/R=30% to 98%, R2/R=15% to 98%, and an aspect ratio indicated by D/R1=0.08 to 0.98 are satisfied, wherein R1 is a distance from a bottom center of the silica powder molded body to an outer circular arc of the fan-shaped region, R2 is a distance from the bottom center of the silica powder molded body to an inner circular arc of the fan-shaped region, R is a distance from the bottom center to an inner-circumferential wall of the silica powder molded body, and D is an interelectrode distance of the closer carbon electrodes.

Accordingly, the vitreous silica crucible can be manufactured while performing fire polishing for removing the bubbles or impurities from the inner surface of the vitreous silica crucible by applying the arc flames. Thus, the vitreous silica crucible having few bubbles or impurities on the crucible inner surface and capable of achieving a high crystallization rate while pulling up the silicon single crystal can be manufactured.

Preferably, relationships of R1/R=30% to 98%, H/H2=1% to 130%, and θ1=2° to 60° are satisfied, wherein H is a height direction distance of the tips of the closer carbon electrodes in a central axial direction of the silica powder molded body, θ1 is a relative angle between a mold rotation axis of the silica powder molded body and the central axis of the closer carbon electrodes, H2 is a height of the silica powder molded body, and R is a distance from a bottom center of the silica powder molded body to an inner-circumferential wall.

Accordingly, the vitreous silica crucible can be manufactured while performing fire polishing for removing the bubbles or impurities from the inner surface of the vitreous silica crucible by applying the arc flames. Thus, the vitreous silica crucible having few bubbles or impurities on the crucible inner surface and capable of achieving a high crystallization rate while pulling up the silicon single crystal can be manufactured. Here, a height direction distance H in a mold central axial direction of the silica powder molded body denotes a height from a bottom center of the silica powder molded body to the tip position. If heights to a plurality of electrode tip positions are different from each other, for example, if the mold rotation axis and an arc flame direction formed by a plurality of electrodes are at an angle, or the like, the height direction distance H may mean a height from the bottom center to a center (center of gravity) of a polygonal formed by the plurality of electrode tips, or may be set according to an average of the heights from the bottom center to the plurality of electrode tips.

A relative angle of the central axis of each of the closer carbon electrodes with respect to the mold rotation axis may be set in a range from 0 to 60°. Accordingly, it is possible to efficiently apply the arc flames generated between the carbon electrodes to the crucible inner surface.

A distance between the tips of the closer carbon electrodes and a target surface may be in a range from 5 to 260 mm. Accordingly, the crucible properties may be improved by removing a layer having a thickness of about 0.1 to 0.5 to 2 mm in a depth direction from the crucible inner surface along with the bubbles or impurities therein.

An apparatus for manufacturing a vitreous silica crucible, wherein a vitreous silica crucible is manufactured by using a rotation molding method that molds raw silica powder in a mold for crucible molding, and heats and fuses a molded body thereof by using an arc discharge through a plurality of carbon electrodes, according to the method of above, the apparatus includes: a mold for supplying and molding the raw silica powder; an arc discharging unit including a plurality of carbon electrodes and a power supplying unit; and an electrode position setting unit disposing at least a pair of carbon electrodes of the plurality of carbon electrodes closer to an inner surface of the silica powder molded body than other carbon electrodes, wherein an arc fusing process that fuses the silica powder molded body is performable by using arc flames generated by the plurality of carbon electrodes, and a fire polishing process that partially removes an inner surface of the silica powder molded body is performable by using arc flames generated by the closer carbon electrodes during the arc fusing process. Accordingly, the crucible properties may be improved by removing the bubbles and impurities of the silica crucible inner surface.

The electrode position setting unit may be capable of setting a relative angle between the central axis of each of the pair of the closer carbon electrodes with respect to and the mold rotation axis, to be in a range from 0 to 60°. Accordingly, it is possible to efficiently apply the arc flames generated between the carbon electrodes to the crucible inner surface.

The apparatus may further include a mold position setting unit capable of controlling a horizontal direction position and angle of a mold rotation central line constituting a rotation axis of the mold, and a height of the mold. Accordingly, it is possible to control a relative position between the carbon electrodes and the mold to a desired position. Consequently, the vitreous silica crucible having uniform characteristics can be manufactured since the silica powder molded body is uniformly fused during the arc fusing process, and the bubbles and impurities of the inner surface of the vitreous silica crucible are uniformly removed during the fire polishing process.

A position of each carbon electrode tip may be settable by using any one or both of the electrode position setting unit and the mold position setting unit. Accordingly, the arc flames applied to the target surface may be stabilized during the fire polishing process, and thus the bubbles and impurities of the inner surface of the vitreous silica crucible may be uniformly removed. Consequently, uniformity of the crucible inner surface increases, thereby improving the crucible properties.

A distance between each carbon electrode tip and the target surface of the silica powder molded body supplied inside the mold may be settable in a range from 5 to 260 mm. Accordingly, the crucible properties may be improved by removing a layer of about 0.1 to 2 mm from the crucible inner surface along with the bubbles or impurities therein.

According to the present invention, a vitreous silica crucible having few bubbles or impurities in a crucible inner surface and capable of achieving a high crystallization rate while pulling up silicon single crystal can be manufactured by performing fire polishing for removing the bubbles or impurities from the inner surface of the vitreous silica crucible by applying arc flames.

BRIEF DESCRIPTION OF THE DRAWINGS

FIG. 2 is a schematic plan view showing an electrode arrangement state of an apparatus for manufacturing a vitreous silica crucible, according to the present invention, wherein FIG. 2(a) is a top perspective view of disposed electrodes viewed on the top thereof, and FIG. 2(b) is a side view of the disposed electrodes viewed on the side thereof.

DESCRIPTION OF THE PREFERRED EMBODIMENTS

Hereinafter, a method and apparatus for manufacturing a vitreous silica crucible, according to an embodiment of the present invention will be described in detail with reference to drawings.

Figure 1:
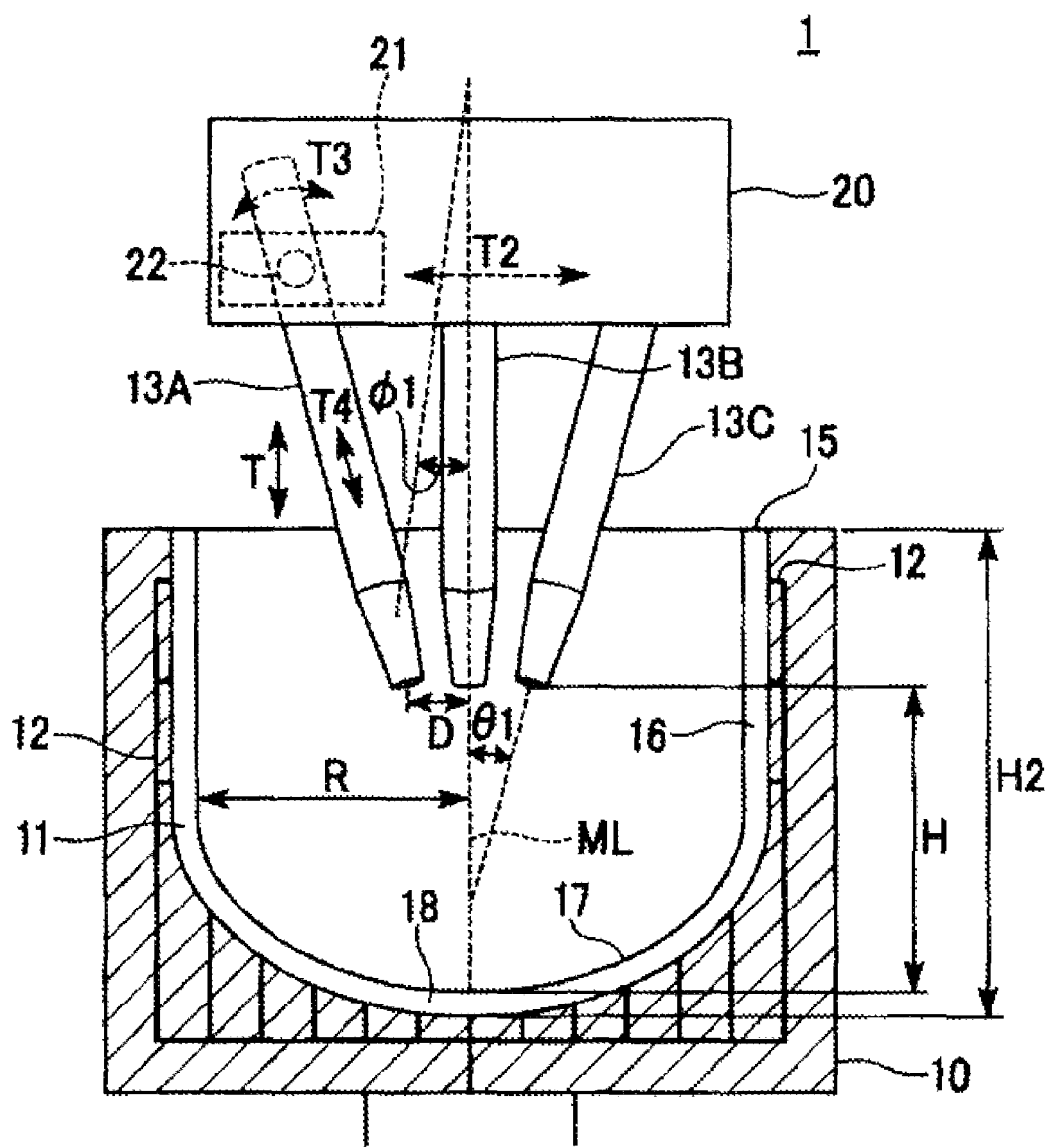
FIG. 1 is a schematic front cross-sectional view showing an apparatus for manufacturing a vitreous silica crucible, according to an embodiment of the present invention.

FIG. 1 is a schematic front cross-sectional view showing an apparatus for manufacturing a vitreous silica crucible, according to an embodiment of the present invention. In drawings, a reference numeral 1 denotes the apparatus for manufacturing a vitreous silica crucible.

The method of manufacturing a vitreous silica crucible of the present invention uses a rotation molding method using the apparatus 1 for manufacturing a vitreous silica crucible shown in FIG. 1. As shown in FIG. 1, the apparatus 1 for manufacturing a vitreous silica crucible includes a mold 10, which is rotatable by a rotating unit that is not shown and defines an outer shape of the vitreous silica crucible, wherein raw silica powder is supplied inside the mold 10 to a predetermined thickness to become silica powder molded body 11 of a vitreous silica crucible type. A plurality of vents 12 penetrating through an inner surface of the mold 10 while being connected to a depressurizing unit that is not shown are provided inside the mold 10, thereby depressurizing the inside of the silica powder molded body 11. Carbon electrodes 13A, 13B, and 13C for arc heating, which are connected to a power supplying unit that is not shown, are provided at an upper position of the mold, and are capable of heating the silica powder molded body 11. The carbon electrodes 13A, 13B, and 13C are capable of being moved up and down as indicated by an arrow T in drawings by an electrode position setting unit 20, and is also capable of setting a distance D between electrode tips.

The apparatus 1 for manufacturing a vitreous silica crucible according to the present embodiment is a high output apparatus capable of heating and fusing a non-conductive object (raw silica powder) via arc discharge by using the plurality of carbon electrodes 13A, 13B, and 13C, for example, within an output range from 300 kVA to 12000 kVA.

Also, synthetic silica powder is mainly used as the raw silica powder for an inner surface layer of the silica powder molded body 11, and natural silica powder may be used as the raw silica powder for an outer surface layer.

Here, the synthetic silica powder is formed of synthetic silica that is a raw material chemically synthesized and prepared, and synthetic silica powder is amorphous. It is possible to easily refine the synthetic silica since the raw material of the synthetic silica is a gas or liquid, and thus the synthetic silica powder may be more highly pure than the natural silica powder. A raw material of the synthetic silica is derived from a gas, such as silicon tetrachloride, or the like, or derived from a liquid, such as silicon alkoxide. All impurities in the synthetic silica powder can be less than or equal to 0.1 ppm.

When a Sol-Gel method is used, 50 to 100 ppm of silanol generated by hydrolyzing alkoxide generally remains in the synthetic silica powder. It is possible to control the silanol in a wide range from 0 to 1000 ppm in the synthetic fused silica by using carbon tetrachloride as a raw material, but generally, at least about 100 ppm of chlorine is included. When the alkoxide is used as a raw material, a synthetic fused silica not containing chlorine may be easily obtained.

As described above, the synthetic silica powder according to the Sol-Gel method contains about 50 to 100 ppm silanol before fusing. When the synthetic silica powder is vacuum-fused, the silanol is detached, and an amount of silanol of the obtained fused silica is reduced to 5 to 30 ppm. Here, the amount of silanol differs according to fusing conditions, such as a fusing temperature, a heating temperature, or the like. The amount of silanol of a glass obtained by fusing the natural silica powder under the same conditions is less than 50 ppm.

Generally, the synthetic fused silica is known to have a lower viscosity at a high temperature than the fused silica obtained by fusing the natural silica powder. One reason for this is that the silanol or halogen cuts a net knot structure of a $SiO_4$ tetrahedron.

When light transmittance is measured in the glass obtained by fusing the synthetic silica powder, the glass transmits ultraviolet rays having a wavelength of up to about 200 nm, which is a characteristic close to synthetic fused silica using silicon tetrachloride as a raw material, which is used for ultraviolet optical purposes.

When a fluorescence spectrum obtained by exciting the glass, which is obtained by fusing the synthetic silica powder, with ultraviolet rays having a wavelength of 245 nm, a fluorescence peak like a fused product of the natural silica powder cannot be seen.

Also, the natural silica powder is formed of natural silica, and the natural silica is a raw material obtained by mining a quartz gemstone existing in nature and performing processes, such as pulverizing and refining, or the like, on the quartz gemstone. The natural silica powder is formed of crystals of a-quartz. At least 1 ppm of Al and Ti are included in the natural silica powder. Also, levels of other metal impurities are higher in the natural silica powder than the synthetic silica powder. The natural silica powder barely includes silanol. The amount of silanol of a glass obtained by fusing the natural silica powder is less than 50 ppm.

When light transmittance is measured from the glass obtained from the natural silica powder, the transmittance remarkably decreases when a wavelength is 250 nm or less and a light hardly transmits through the glass when a wavelength is 200 nm, mainly due to Ti of about 1 ppm included as an impurity. Also, an absorption peak resulting from oxygen defect is shown near a wavelength of 245 nm.

Also, fluorescence peaks are observed at wavelengths of 280 nm and 390 nm when a fluorescence spectrum obtained by exciting the fused product of the natural silica powder with ultraviolet rays having a wavelength of 245 nm is measured. The fluorescence peaks result from a deficiency of an oxygen combination in the glass.

It can be determined whether a glass material is natural silica or synthetic silica by measuring concentration of contained impurities, measuring a difference in the silanol amount or light transmittance, or measuring a fluorescence spectrum obtained via excitation using ultraviolet rays having a wavelength of 245 nm.

In the present invention, although silica powder is used as a raw material, the "silica powder" referred herein is not limited to quartz powder, but may include powder of a material that is well known as a raw material of a vitreous silica crucible, including silicon dioxide (silica), such as a crystal, quartz sand, or the like, as long as the above conditions are satisfied.

Figure 2:
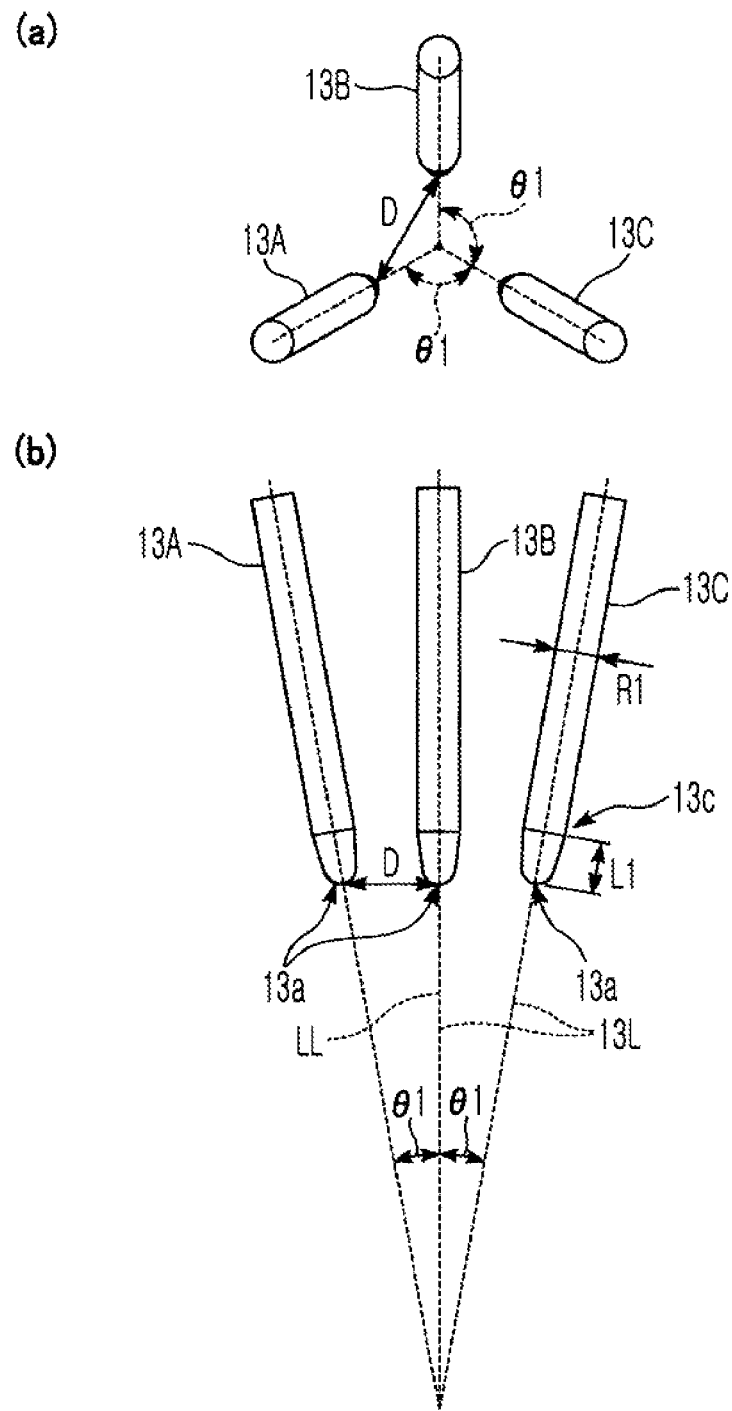
Figure 3:
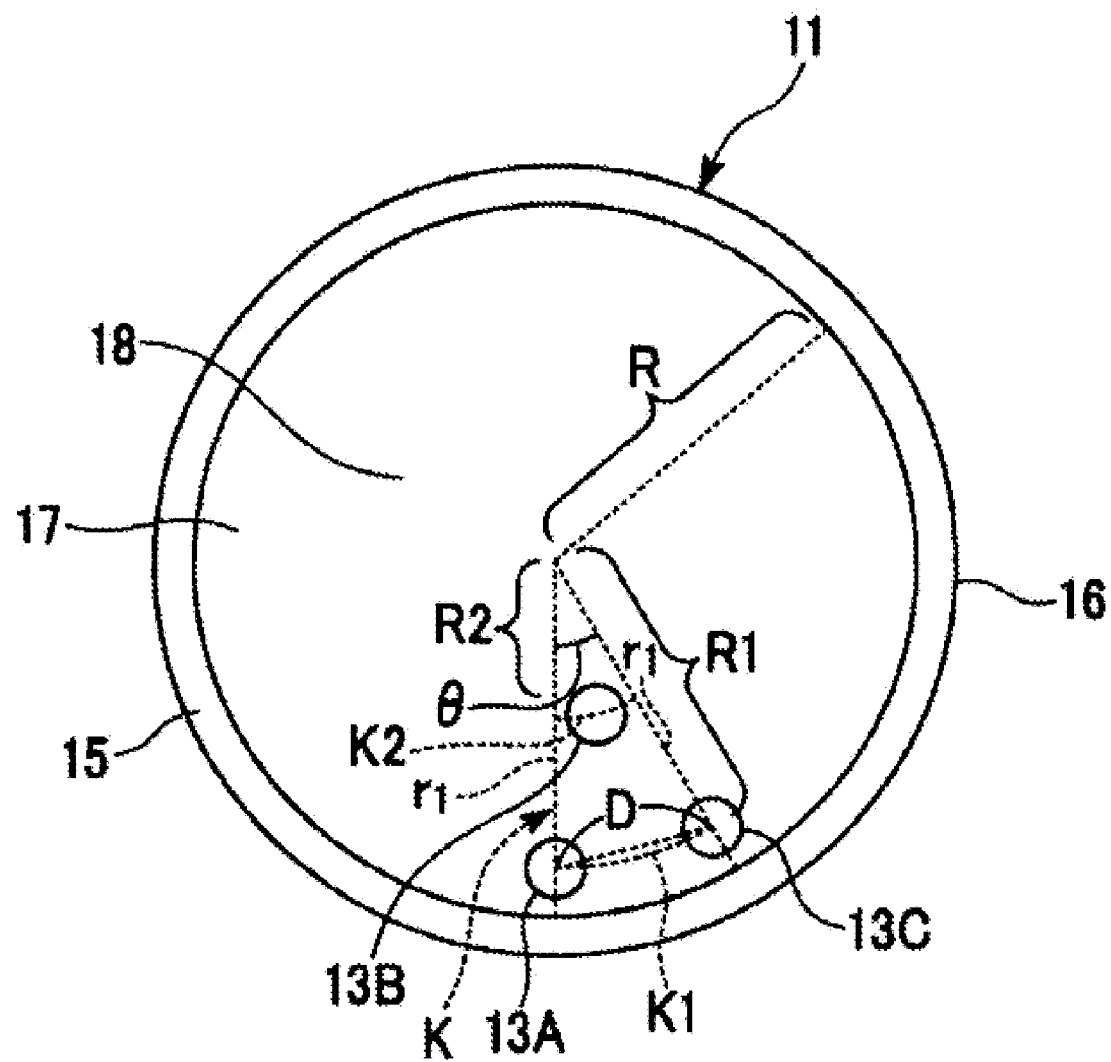
FIG. 3 is a schematic plan view showing an electrode arrangement state of an apparatus for manufacturing a vitreous silica crucible, according to the present invention.

FIGS. 2 and 3 are schematic side views showing arrangement of carbon electrodes in an arc discharge device, according to the present embodiment.

The carbon electrodes 13A, 13B, and 13C are rod-type electrodes having the same shape to perform, for example, an alternating 3-phase (R-phase, S-phase, and T-phase) arc discharge, and are each provided such that respective axes 13L form an angle θ1, in such a way that the carbon electrodes 13A, 13B, and 13C have an inverted pyramid shape having the apex at the bottom, as shown in FIG. 2. The application of an electric current to each carbon electrode 13 is controllable by a control unit that is not shown. An arc flame direction is shown to be identical to an electrode position central axis LL in FIG. 2, as a position setting state of the carbon electrode 13. The number of electrodes, the arrangement state, and the power supplying method are not limited to the above configurations, and other configurations may be employed.

The carbon electrode 13 is formed of high purity carbon particles having a particle diameter less than or equal to 0.3 mm, preferably less than or equal to 0.1 mm, and more preferably less than or equal to 0.05 mm. A density difference between carbon electrodes disposed on the respective electrode phases can be less than or equal to 0.2 g/cm$^3$ when a density of the high purity carbon particles is from 1.30 g/cm$^3$ to 1.80 g/cm$^3$ or from 1.30 g/cm$^3$ to 1.70 g/cm$^3$, and thus the carbon electrodes 13 have high homogeneity.

As shown in FIG. 1, the electrode position setting unit 20 includes a supporter 21 that supports the carbon electrodes 13A, 13B, and 13C such that the distance D between the electrode tips of the carbon electrodes 13A, 13B, and 13C is settable, a horizontal moving unit capable of moving the supporter 21 in a horizontal direction, a vertical moving unit capable of moving the plurality of supporters 21 and the horizontal moving unit in a vertical direction as one body, and a rotating angle setting unit capable of changing a supporting angle of a carbon electrode. Here, the supporter 21 supports the carbon electrode 13 to be rotatable around an angle setting axis 22, and includes a rotating unit that controls a rotating angle of the angle setting axis 22.

In order to adjust the distance D between the electrode tips of the carbon electrodes 13 and the electrode position state of the carbon electrodes 13, angles of the carbon electrodes 13 are controlled by the rotating angle setting unit as indicated by an arrow T3 of FIG. 1, and a horizontal position of the supporter 21 is controlled by the horizontal moving unit as indicated by an arrow T2 of FIG. 1. Also, the horizontal direction positions of the electrode central axis LL and a mold rotation axis ML may be controlled by the horizontal moving unit. Also, a height position of each electrode tip 13a with respect to a bottom position of the silica powder molded body 11 may be controlled by controlling a height position of the supporter 21 by using the vertical moving unit as shown in an arrow T of FIG. 1. At the same time, it is possible to control a generation direction (electrode central axis LL) of arc flames such that an angle Φ1 is displaced from the vertical direction by the rotating angle setting unit individually setting an angle of each of the carbon electrodes 13A, 13B, and 13C.

Figure 5:
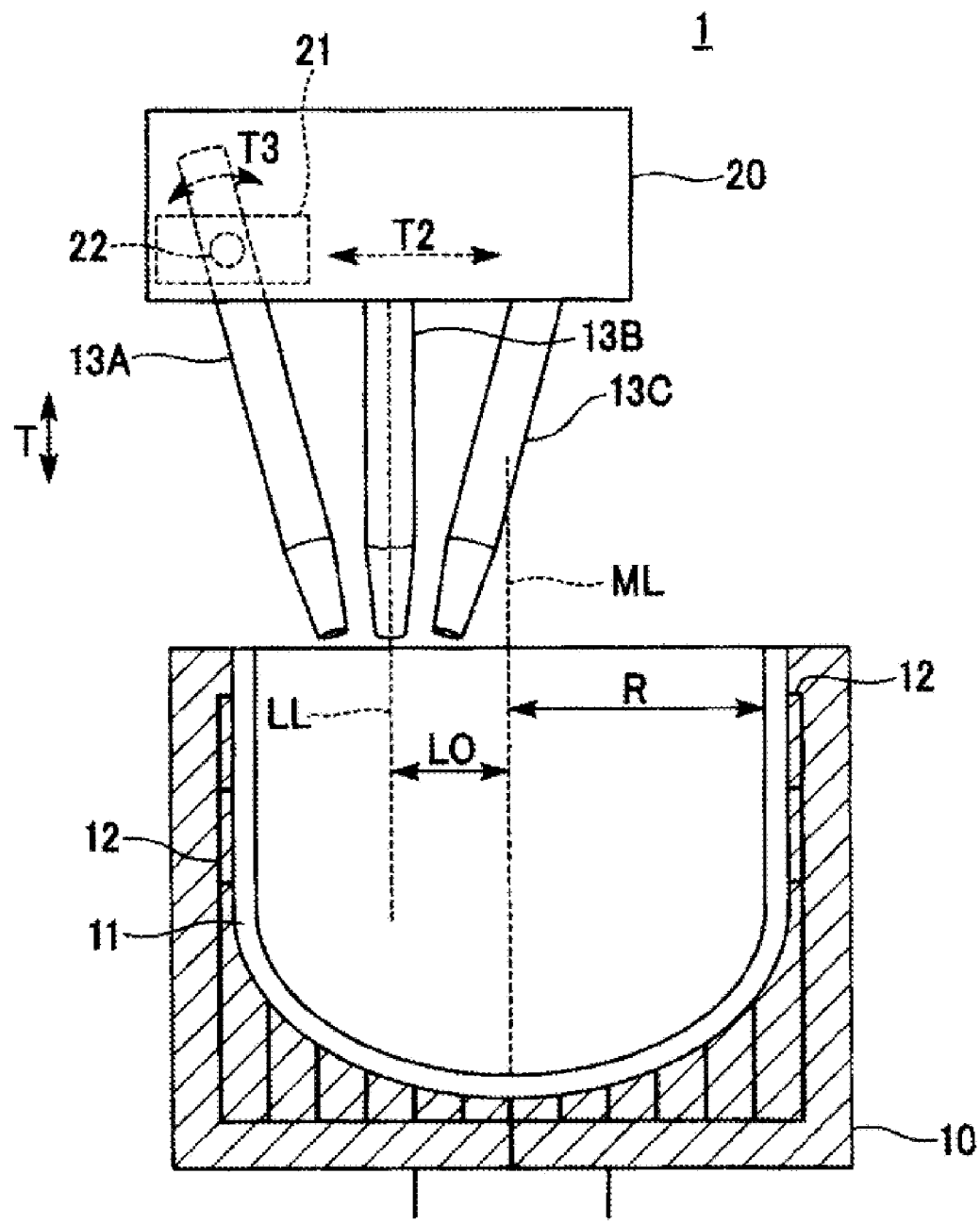
FIG. 5 is a schematic front view showing an eccentric arc electrode arrangement state of an apparatus for manufacturing a vitreous silica crucible, according to the present invention.

Also in FIGS. 1 and 5, the supporter 21 or the like is shown only for the left carbon electrode 13A, but other carbon electrodes are supported by the same structure, and a height (arrow T), a horizontal direction position (arrow T2), an angle (arrow T3), and a length size (arrow T4) of each carbon electrode 13 may be individually controlled by combining the setting units.

Figure 4:
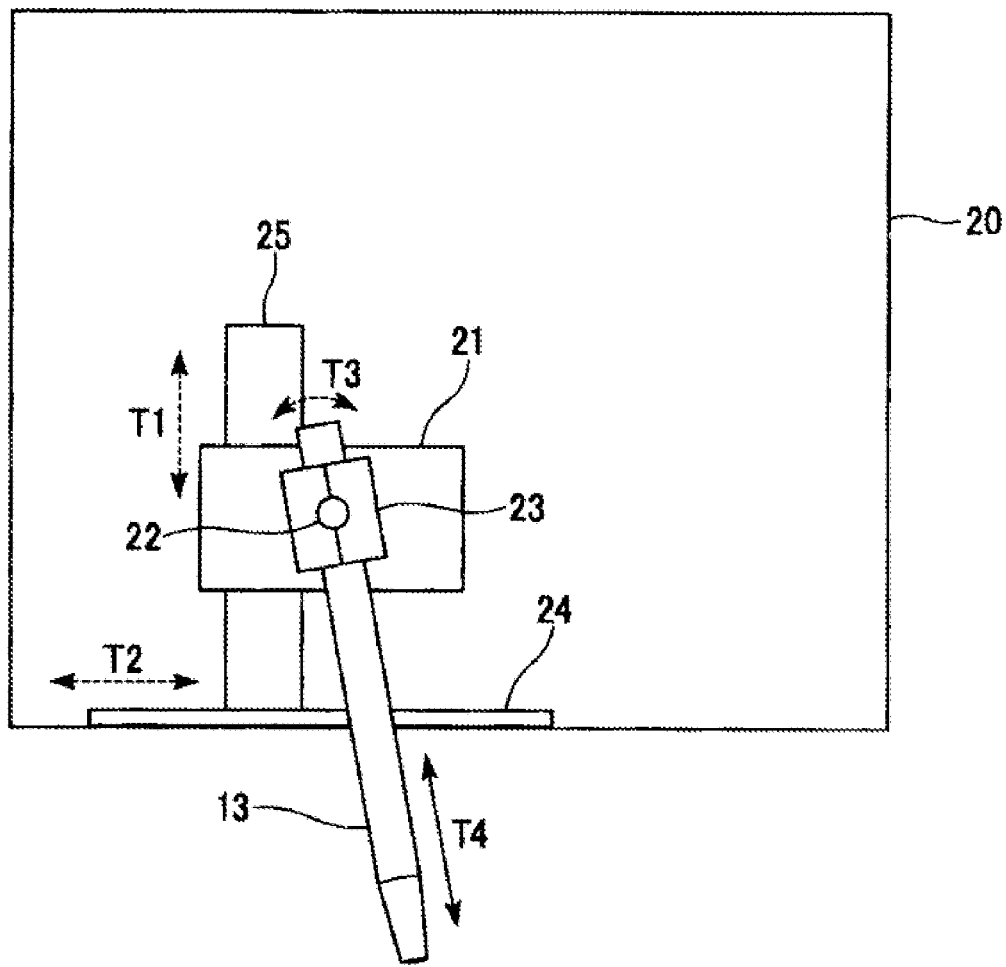
FIG. 4 is a schematic front view showing an embodiment of an electrode position setting unit of an apparatus for manufacturing a vitreous silica crucible, according to the present invention.

As shown in FIG. 4, in the electrode position setting unit 20, a pedestal 24 is provided to be movable in a horizontal direction (XY direction) at a ceiling portion in an upper side of the mold 10, which separates an internal space and an external space of a vitreous silica manufacturing furnace. In the pedestal 24, a vertical direction regulating unit 25 that regulates a vertical direction position of the supporter 21 by using a mechanism, such as a rack pinion or the like, is provided by being extended from the pedestal 24, and the supporter 21 is provided to be movable in the vertical direction T1. An electrode supporter 23 is provided at the supporter 21 to freely rotate around the angle setting axis 22. The electrode supporter 23 supports the carbon electrode 13 as a chuck unit, and is capable of setting a size of the length direction T4 and is detachable. A rotating angle between the supporter 21 and the electrode supporter 23, a horizontal direction position of the pedestal 24, and a vertical direction position between the vertical direction regulation unit 25 and the supporter 21 are settable by a position regulating unit and a driving unit that drives the position regulating unit, which are not shown.

Figure 6:
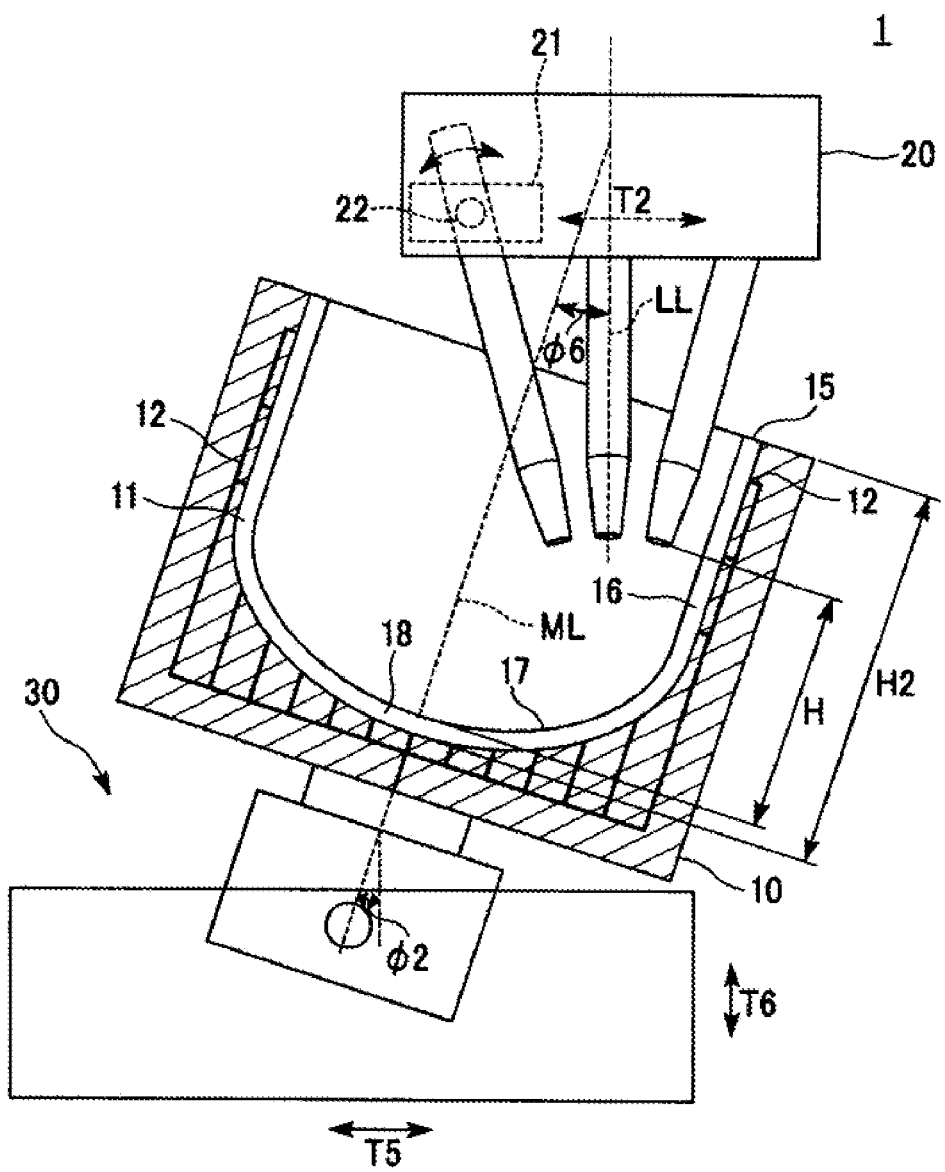
FIG. 6 is a schematic front view showing an arc state, wherein an electrode of an apparatus for manufacturing a vitreous silica crucible is displaced, according to the present invention.

Also in the present invention, other structures may be used as long as the position state of the carbon electrode 13 is controllable. In detail, as shown in FIG. 6, a relative position state between the carbon electrodes 13A, 13B, and 13C, and the mold 10 may be controllable by performing a position setting by tilting the mold rotation axis ML by an angle φ2 from the vertical direction around a rotation axis 31 in a horizontal direction, and enabling the angle of the mold 10 in a rotating state to be changeable, by using a mold position setting unit 30 capable of displacing the rotation axis (mold rotation axis ML) of the mold 10 from the vertical direction. As shown in FIG. 6, the mold position setting unit 30 includes a rotating angle setting unit capable of changing the mold rotation axis ML of the mold 10 by the angle φ2 from the vertical direction, the horizontal moving unit capable of moving the mold 10 in a horizontal direction (arrow T5), and a vertical moving unit capable of moving the mold 10 in a vertical direction (arrow T6). The relative position state of the mold 10 in a rotating state and each of the carbon electrodes 13A, 13B, and 13C may be controllable by combining the setting units.

Figure 7:
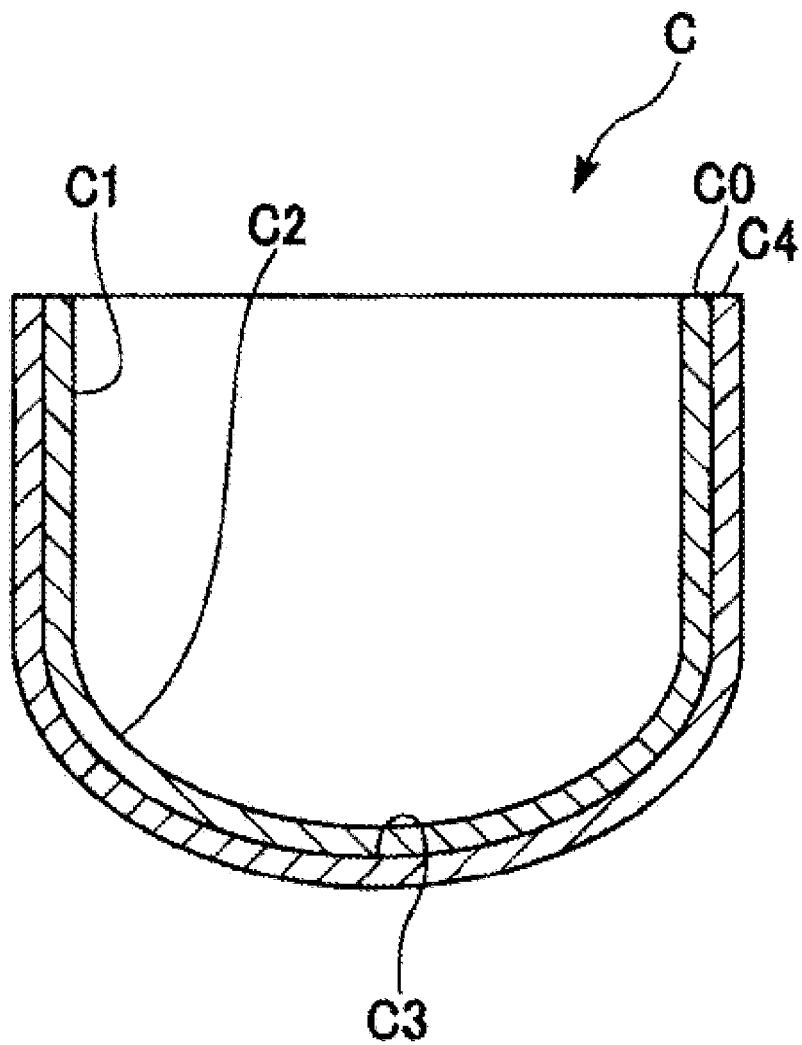
FIG. 7 is a front cross-sectional view showing a vitreous silica crucible manufactured by a method and apparatus for manufacturing a vitreous silica crucible, according to an embodiment of the present invention.

FIG. 7 shows a cross-sectional structure of an example of a vitreous silica crucible obtained by fusing silica powder by using arc fusing according to a rotation molding method of the present invention. A vitreous silica crucible C manufactured according to the method of the present invention has a cup shape having an opened top surface, includes a straight body portion C1 forming an upper portion of the vitreous silica crucible C, a curved portion C2 continuing from a lower portion of the straight body portion C1, and a bottom portion C3 continuing from a lower portion of the curved portion C2, and has a double structure consisting of a transparent layer C0 provided at an inner surface side and a non-transparent layer C4 having many bubbles provided at an outer surface side.

Since the vitreous silica crucible C is formed by arc fusing the silica powder molded body 11 shown in FIG. 1, a portion of the silica powder molded body 11 corresponding to a portion constituting the straight body portion C1 of the vitreous silica crucible C is called a straight body portion 16, an opening of the straight body portion 16 is called a rim portion 15, a portion of the silica powder molded body 11 corresponding to a portion constituting the curved portion C2 of the vitreous silica crucible C is called a curved portion 17, and a portion of the silica powder molded body 11 corresponding to a portion constituting the bottom portion C3 of the vitreous silica crucible C is called a bottom portion 18.

A method of manufacturing a vitreous silica crucible according to the present embodiment will now be described with reference to drawings.

Figure 8:
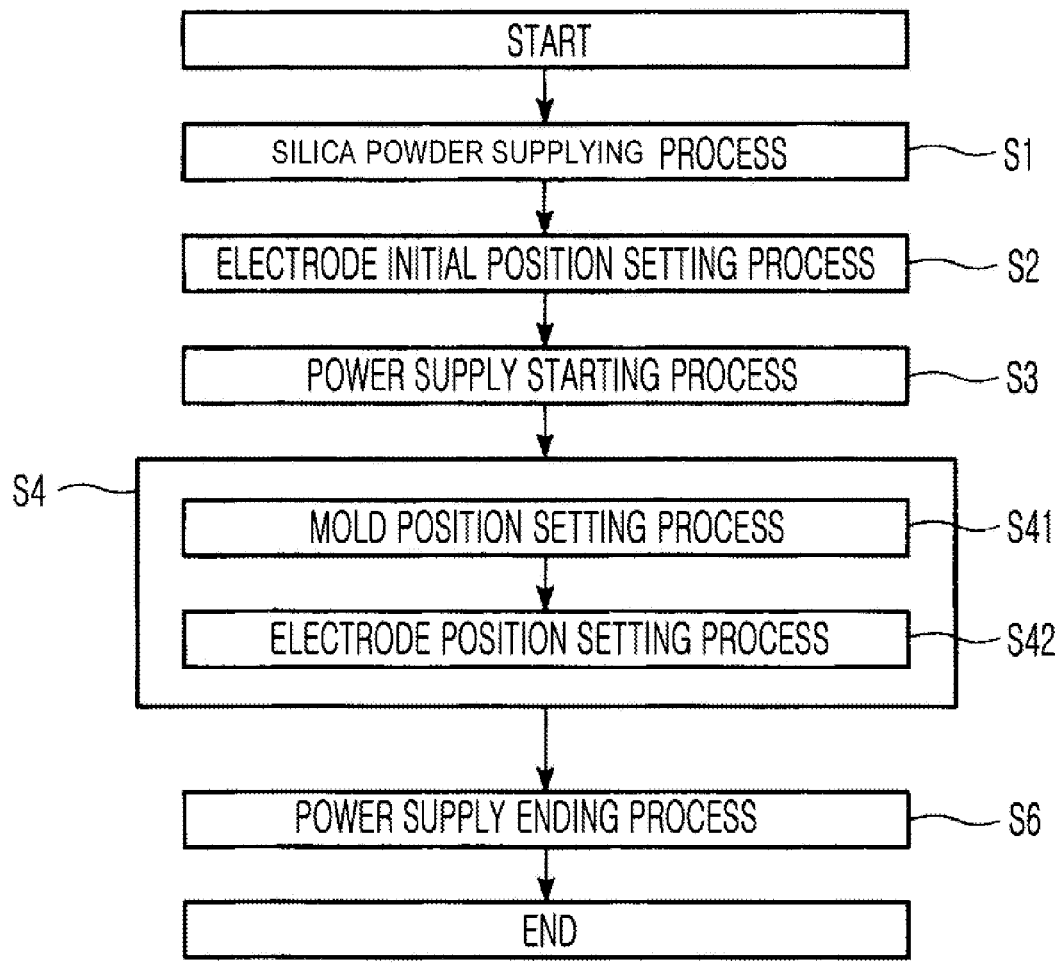
FIG. 8 is a flowchart showing a method of manufacturing a vitreous silica crucible, according to an embodiment of the present invention.

FIG. 8 is a flowchart showing an example of a method of manufacturing a vitreous silica crucible, according to the present embodiment.

The method of manufacturing a vitreous silica crucible, according to the present embodiment, uses the rotation molding method using the apparatus 1 for manufacturing a vitreous silica crucible shown in FIG. 1, and includes a silica powder supplying process S1, an electrode initial position setting process S2, a power supply starting process S3, an arc fusing process S4 including a fire polish manipulation, and a power supply ending process S6, as shown in FIG. 8. Each process will now be described.

<Silica Powder Supplying Process S1>

In the silica powder supplying process S1 shown in FIG. 8, raw silica powder is deposited on the inner surface of the mold 10 so as to mold the silica powder molded body 11 to a desired state. The silica powder molded body 11 is held against an inner wall surface by a centrifugal force according to rotation of the mold 10.

<Electrode Initial Position Setting Process S2>

In the electrode initial position setting process S2 in FIG. 8, an electrode initial position is set such that the electrode tips 13*a* contact each other while the carbon electrodes 13A, 13B, and 13C maintain the inverted pyramid shape having the apex at the bottom by the electrode position setting unit 20, and each axis 13L maintains the angle θ1, as shown in FIGS. 1, 2, and 3. At the same time, an initial state of an electrode height that is a height from a boundary of the mold 10 to the electrode tip, or a mold-electrode relative position state composed of a position and an angle between an electrode position central axis that is a central axis of the inverted pyramid formed by the carbon electrodes 13A, 13B, and 13C, and the rotation axis of the mold 10, is set.

<Power Supply Starting Process S3>

In the power supply starting process S3 of FIG. 8, the power supplying unit that is not shown starts to supply power to the carbon electrodes 13A, 13B, and 13C, wherein a power amount is set in an output range from 300 kVA to 12,000 kVA. Also, in the present embodiment, a 3-phase alternating current may be supplied to 3 carbon electrodes. Here, an arc discharge is not yet generated.

<Arc Fusing Process S4>

The arc fusing process S4 shown in FIG. 8 includes a mold position setting process S41 and an electrode position setting process S42. In the arc fusing process S4, mold position setting is performed by the mold position setting unit 30, position setting of the carbon electrode 13 is performed by the electrode position setting unit 20, and the held silica powder molded body 11 is heated by using the arc discharging unit while depressurizing the silica powder molded body 11 through the vent 12, thereby forming a vitreous silica layer while a target surface of the inner surface of the silica powder molded body 11 is fused. In the mold position setting process S41 shown in FIG. 8, the height position T6 of the vertical direction of the mold, the horizontal direction position T5, and an inclination φ2 of the mold rotation axis ML with respect to the vertical direction are set by the mold position setting unit 30 as shown in FIG. 6.

Next, in the electrode position setting process S42 of FIG. 8, the inverted pyramid shape of the carbon electrodes 13A, 13B, and 13C having the apex at the bottom is maintained, or the distance D between the electrode tips is increased by changing the angle of the carbon electrodes 13A, 13B, and 13C, by using the electrode position setting unit 20. Accompanied by this, discharge is generated between the carbon electrodes 13A, 13B, and 13C. Here, the power supply is controlled by the power supplying unit such that power density in each carbon electrode 13 is from 40 kVA/cm$^2$ to 1700 kVA/cm$^2$. Also, the mold-electrode relative position state, such as the electrode height position or the like, is set by using the electrode position setting unit 20 so that conditions of a heat source required to fuse the silica powder molded body 11 are satisfied while maintaining the angle θ1. For example, an eccentric state of the carbon electrode 13 with respect to the mold rotation axis ML as shown in FIG. 5, or a state of combining and adjusting the electrode central axis LL and the mold position setting as shown in FIG. 6, may be set as the mold-electrode relative position state, and the mold-electrode relative position state may be set to satisfy the conditions as the heat source required to fuse the silica powder molded body 11.

Also, an example of performing the electrode position setting process S42 after the mold position setting process S41 is shown in the arc fusing process S4 of FIG. 8, but the present invention is not limited thereto. The electrode position setting process S42 may be performed before the mold position setting process S41, or the mold position setting process S41 and the electrode position setting process S42 may be performed simultaneously. Alternatively, the mold-electrode relative position state may be set by any one of the mold position setting process S41 and the electrode position setting process S42.

<Fire Polishing Manipulation>

In the present embodiment, a position of each electrode is adjusted so that the fire polishing manipulation can be simultaneously performed in the arc fusing process S4. In order to simultaneously perform the fire polishing manipulation in the arc fusing process S4, the mold position setting unit 30 performs mold position setting and the electrode position setting unit 20 performs position setting of the carbon electrodes 13A, 13B, and 13C, thereby adjusting each electrode position as will be described below.

In the present embodiment, when the arc fusing process S4 is performed on the straight body portion 16 of the silica powder molded body 11, and when a pair of carbon electrodes 13A and 13C of the 3 carbon electrodes 13A, 13B, and 13C are disposed toward an inner-circumferential surface of the straight body portion 16 of the silica powder molded body 11, tip positions of the carbon electrodes 13A and 13C are arranged closer to the inner-circumferential surface of the straight body portion 16 so that the tips are at equal distances from the inner-circumferential wall surface of the straight body portion 16, and the remaining carbon electrode 13B is disposed at an inner side than the carbon electrodes 13A and 13C as shown in FIG. 3, and thus the carbon electrodes 13A, 13B, and 13C are disposed at triangular positions when viewed on a plane. In such a triangular arrangement, it may be disposed at the apex position of an equilateral triangle.

The silica powder molded body 11 is arc fused while maintaining a state in which all tips of the carbon electrodes 13A, 13B, and 13C are disposed inside a fan-shaped region K surrounded by a radius r1 that passes through each of the tips of the pair of carbon electrodes 13A and 13C disposed closer to the inner-circumferential wall surface, a circular arc K1 that passes through the tips of the pair of carbon electrodes 13A and 13C, and a circular arc K2 that passes through the tip of the other carbon electrode 13B disposed at an inner side of the silica powder molded body than the pair of carbon electrodes, assuming that a radius and a circular arc are defined by a circle of the inner-circumferential wall surface of the straight body portion 16 of the silica powder molded body 11 when the silica powder molded body 11 having the crucible shape is viewed on a plane, as a definition of a position of the pair of carbon electrodes 13A and 13C disposed closer to the inner-circumferential wall surface of the straight body portion 16 and as a definition of a position of the other carbon electrode 13B when the silica powder molded body 11 having the crucible shape is viewed on the plane. Also, in FIG. 3, since a rough shape of each of the carbon electrodes 13A, 13B, and 13C is a circle, each electrode tip is indicated by a center of the circle.

In detail, when a distance from a bottom center of the silica powder molded body 11 to the outer circular arc K1 of a fan-shaped region S defining the tip positions of the carbon electrodes 13A and 13C is defined as R1, a distance from the bottom center of the silica powder molded body to the inner circular arc K2 of the fan-shaped region defining the positions of the carbon electrode tips is defined as R2, a distance from the bottom center of the silica powder molded body to an inner-circumferential wall is defined as R, and a distance between the pair of carbon electrodes disposed closer to the inner-circumferential wall surface of the silica powder molded body is defined as D, the arc fusing process S4 is performed while determining the positions of the carbon electrodes 13A, 13B, and 13C in such a way that relationships of R1/R=30% to 98%, and R2/R=15% to 98% are satisfied and also a condition that an aspect ratio indicated by D/R1 is in the range from 0.08 to 0.98.

R1/R is, for example, 30, 40, 50, 60, 70, 80, 90, 95, 96, 97, 98%, and it may be in the range of any two selected from the values exemplified here. R2/R is, for example, 15, 20, 30, 40, 50, 60, 70, 80, 90, 95, 96, 97, 98%, and it may be in the range of any two selected from the values exemplified here. The aspect ratio indicated by D/R1 is, for example, 0.08, 0.1, 0.2, 0.3, 0.4, 0.5, 0.6, 0.7, 0.8, 0.9, 0.95, 0.97, 0.98, and it may be in the range of any two selected from the values exemplified here. The central angle θ of a fan-shaped region is, for example, 5, 10, 20, 30, 40, 50, 55, 60 degrees, and it may be in the range of any two selected from the values exemplified here.

Although an arc according to sequential 3-phase electric current application is generated between the carbon electrodes 13A, 13B, and 13C by performing the arc fusing process while maintaining the range, since the straight body portion 16 of the silica powder molded body 11 can be sequentially fused by arc flames accompanied by each arc and, at the same time, the arc flames generated by the carbon electrodes 13A and 13C are generated nearest to the straight body portion 16 of the silica powder molded body 11, the target surface of the straight body portion 16 of the vitreous silica crucible fused in the mold 10 can be fire-polished by applying the arc flames to the surface. Here, although the seal layer of the most outer surface formed via initial fusing before vacuum suction in the arc fusing process includes many bubbles or impurities such as crystalline residual products constituting remainders of fused raw material powder, the bubbles or impurities can be removed via the fire polishing.

Here, since a distance between electrodes is narrow when an aspect ratio is less than or equal to 0.08, an output decreases which leads to remarkable deterioration of thermal efficiency, and thus the aspect ratio less than or equal to 0.08 is not preferable. Also, since the distance between electrodes is wide when an aspect ratio is more than or equal to 0.98, the arc is not maintained, and thus an aspect ratio more than or equal to 0.98 is not preferable.

With respect to the conditions of the straight body portion 16 of the above-described silica powder molded body 11, the arc fusing process S4 accompanied by the fire polishing may be performed by disposing the carbon electrodes 13A, 13B, and 13C in the same fan-shaped region under the conditions of the curved portion 17 of the silica powder molded body 11. Here, the detailed conditions may be within the range below.

When the arc fusing process S4 is performed on the curved portion 17, the distance from the bottom center of the silica powder molded body 11 to the outer circular arc K1 of the fan-shaped region S defining the tip positions of the carbon electrodes 13A and 13C is defined as R1, the distance from the bottom center of the silica powder molded body to the inner circular arc K2 of the fan-shaped region defining the positions of the carbon electrode tips is defined as R2, the distance from the bottom center of the silica powder molded body to an inner-circumferential wall is defined as R, and the distance between the pair of carbon electrodes disposed closer to the inner-circumferential wall surface of the silica powder molded body is defined as D, the arc fusing process S4 is performed while determining the positions of the carbon electrodes 13A, 13B, and 13C in such a way that relationships of R1/R=30% to 98%, and R2/R=15% to 98% are satisfied while an aspect ratio indicated by D/R1 is in the range from 0.08 to 0.98.

Here, although an actual control angle is different in the straight body portion 16 and the curved portion 17, the ratio D/R1 does not change because any of the curved portion 17 and the straight body portion 16 has a different diameter size, i.e., the distance R from the bottom center of the silica powder molded body to the inner-circumferential wall, and the control is performed following the state of R. Examples of R1/R, R2/R, θ, and the aspect ratio indicated by D/R1 are as shown above.

The tips of the carbon electrodes 13A and 13C and the inner-circumferential surface of the straight body portion 16 are set to have equal distances in the electrode-mold relative position state when the arc fusing including the fire polishing manipulation is performed. Accordingly, the arc flames are stably generated, and thus the bubbles or impurities included in the target surface of the straight body portion 16 may be removed together from the surface.

When the above-described arc fusing process S4 is performed, a distance $R_{FP}$ between the tips of the carbon electrodes 13A and 13C and a target surface 11a of the straight body portion 16 may be set to be in the range from 5 to 260 mm, and preferably in the range from 10 to 150 mm. When the distance $R_{FP}$ between the tips of the carbon electrodes 13A and 13C and the target surface is below 5 mm, the target surface is deformed since the force of the arc flames applied onto the target surface is too strong, and thus the distance $R_{FP}$ below 5 mm is not preferable as the inner surface of the manufactured vitreous silica crucible becomes uneven. Meanwhile, when the distance $R_{FP}$ between the tips of each of the carbon electrodes 13A and 13C and the target surface is more than or equal to 260 mm, the target surface is not removed by applying the arc flames since the tips of the carbon electrodes 13A and 13C that apply arc flames are too far from the target surface, and thus the distance $R_{FP}$ more than or equal to 260 mm is not preferable.

$R_{FP}$ is, for example, 5, 10, 20, 40, 60, 80, 100, 120, 140, 160, 180, 200, 220, 240, 260 mm, and it may be in the range of any two selected from the values exemplified here.

When the inner surface of the vitreous silica crucible is removed (fire-polished) at the same time as the arc fusing process S4, a relative angle φ6 between the electrode central axis LL formed of a plurality of arc electrodes to which the arc flames are directed, and the mold rotation axis ML may be set in the range from 0° to 60°, and more preferably, in the range from 15° to 45°. Since the fire polishing manipulation of the present invention is a process of removing the inner surface of the vitreous silica crucible by applying the arc flames, the relative angle between the target surface and the electrode central axis LL may be ideally near to 90° during the fire polishing, but considering a general structure of an apparatus for manufacturing a vitreous silica crucible, it is difficult to set the angle to 90°.

Also, when the above-described arc fusing process S4 is performed, the arc fusing process S4 may be additionally performed by controlling the following conditions.

When a height direction distance of a central axial direction of the silica powder molded body 11 with respect to the tip positions of the pair of carbon electrodes 13A and 13C disposed closer to the target surface of the silica powder molded body 11 is defined as H, a tilt angle of the pair of carbon electrodes 13A and 13C disposed closer to the silica powder molded body 11 with respect to the central axis of the silica powder molded body 11 is defined as θ1, a height of the silica powder molded body 11 is defined as H2, and a distance from the bottom center of the silica powder molded body 11 to the inner-circumferential wall of the straight body portion 16 is defined as R, the arc fusing may be performed in such a way that relationships of R1/R=30% to 98%, H/H2=1% to 130%, and θ1=5° to 60° are satisfied.

Examples of R1/R and θ1 are as shown above. H/H2 is, for example, 1, 5, 10, 20, 30, 40, 50, 60, 70, 80, 90, 100, 110, 120, 130%, and it may be in the range of any two selected from the values exemplified here.

Also, when the curved portion 17 is arc fused, the following conditions may be set in such a control system.

R1/R=30%-98%,
H/H2=10%-30%, and
θ1=5°-60°.

Examples of R1/R and θ1 are as shown above. H/H2 is, for example, 10, 15, 20, 25, 30%, and it may be in the range of any two selected from the values exemplified here.

<Power Supply Ending Process S6>

During the power supply ending process S6, the fusing of the silica powder molded body 11 enters a predetermined state, and thus the power supplying unit stops supplying the power after the arc fusing accompanied by the fire polishing is ended.

As such, the vitreous silica crucible is manufactured by fusing the silica powder via the arc fusing accompanied by the fire polishing using the rotation molding method.

The vitreous silica crucible C having the structure shown in FIG. 7 may be obtained via the above-described method. In the vitreous silica crucible C as shown in FIG. 7, the transparent layers C0 of the straight body portion C1, the curved portion C2, and the bottom portion C3 of the crucible have layer thicknesses within a uniform range, and have uniform characteristics. According to the present invention, the method of manufacturing a vitreous silica crucible includes the arc fusing process S4 accompanied by the fire polishing for removing the surface of the vitreous silica crucible by applying the arc flames, and thus the vitreous silica crucible having few bubbles and impurities in the inner surface may be provided. Accordingly, generation of cristobalite on the surface of the vitreous silica crucible is reduced by using the vitreous silica crucible manufactured according to the present invention to pull up silicon single crystal, and thus it is possible to increase a crystallization rate of the silicon single crystal.

Figure 9:
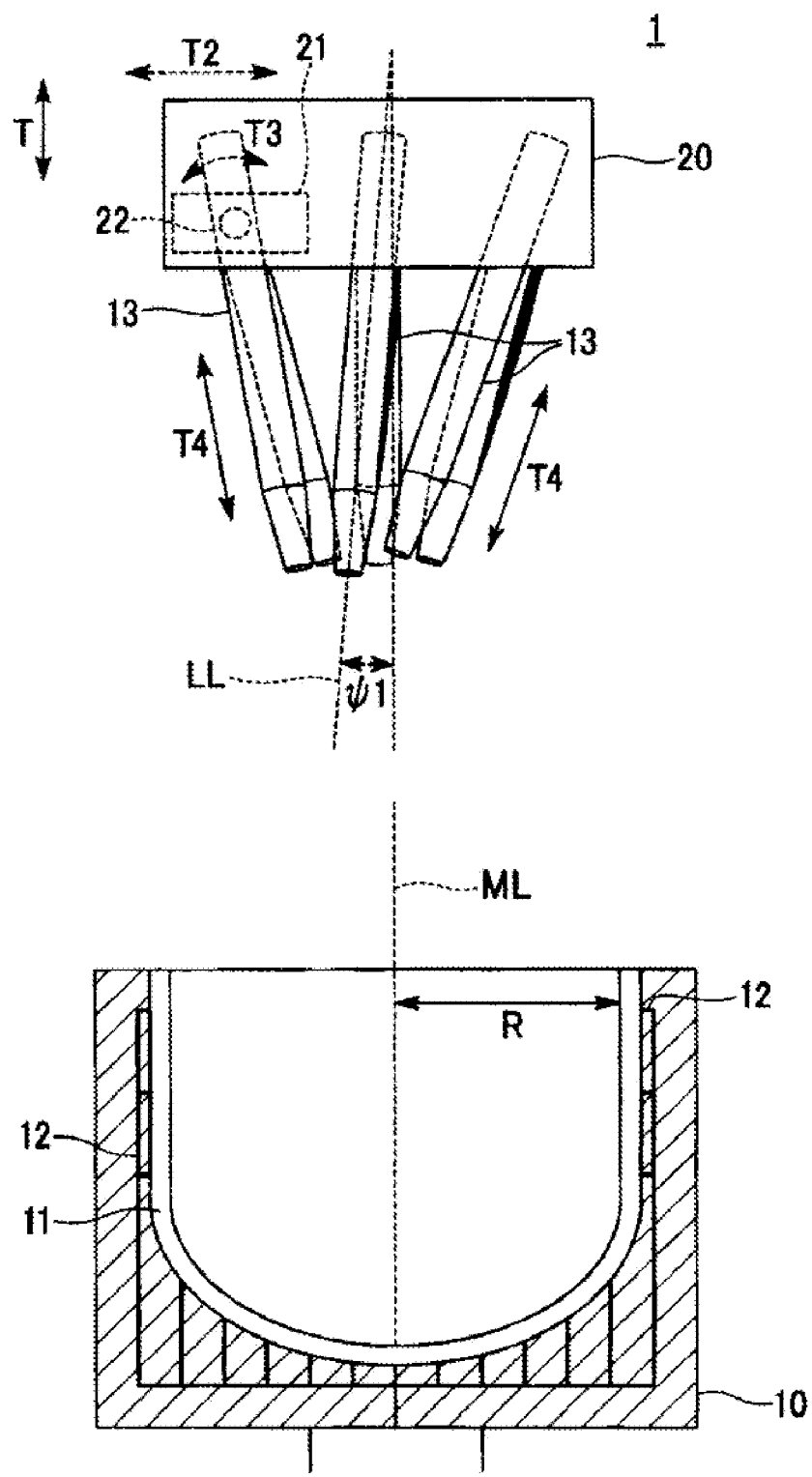
FIG. 9 is a schematic front cross-sectional view showing an apparatus for manufacturing a vitreous silica crucible, according to another embodiment of the present invention.
Figure 10:
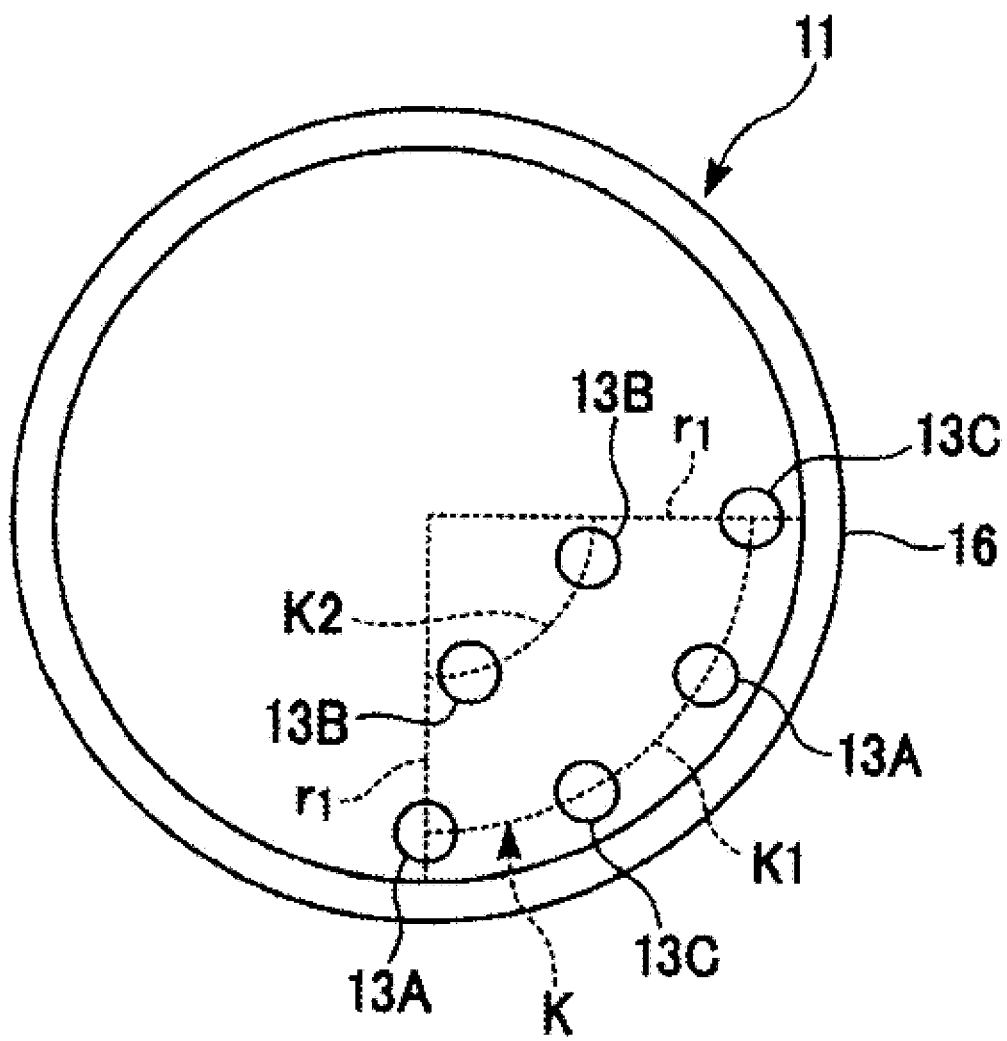
FIG. 10 is a schematic plan view showing an electrode arrangement state of an apparatus for manufacturing a vitreous silica crucible, according to another embodiment of the present invention.

In the present embodiment, an example of an arc discharge through 3 carbon electrodes using 3-phase alternating current is shown, but the present invention is not limited thereto, and the arc fusing process accompanied by the fire polishing may be performed by 6 electrodes using 3-phase alternating current as shown in FIG. 9. An electrode arrangement of the case of 6 electrodes shown in FIG. 9 is shown in FIG. 10, but it is preferred to repeatedly use the arrangement structure of the carbon electrodes 13A, 13B, and 13C shown in FIG. 3. In this case, a range of disposing each electrode may be the same fan-shaped region K described above.

Also in the present invention, aside from the structure (electrode position relationship) of 3 or 6 electrodes using 3-phase alternating current, for example, a number of electrodes may be from 3 to 20, and any electrode structure of 6 electrodes using 2-phase alternating current, 8 electrodes using 2-phase alternating current, 10 electrodes using 2-phase alternating current, 9 electrodes using 3-phase alternating current, 12 electrodes using 3-phase alternating current, 15 electrodes using 3-phase alternating current, 4 electrodes using 4-phase alternating current, 8 electrodes using 4-phase alternating current, 12 electrodes using 4-phase alternating current, and 16 electrodes using 4-phase alternating current may be used.

Also, the apparatus and method of manufacturing a vitreous silica crucible of the present invention may be very suitably used to manufacture a vitreous silica crucible having a diameter (Φ) from 24 to 50 inches.

EXAMPLES

Hereinafter, Examples of the present invention and Comparative Examples are shown together, but the present invention is not limited to the following Examples.

In the Examples and the Comparative Examples, the apparatus 1 for manufacturing the vitreous silica crucible of the present invention shown in FIG. 1 is used based on the rotation molding method, and the vitreous silica crucible is manufactured according to an order of the flowchart of FIG. 8. A diameter of the mold was 32 inches, an average thickness of the silica powder molded body deposited on the mold inner surface was 10 mm, and the arc discharge was performed by 3 electrodes using 3-phase alternating current.

A length of time an electric current was applied during the arc fusing process was 90 minutes, an output was 500 kVA, and the vacuum suction was performed on the silica powder molded body for 20 minutes after the electric current application was started.

Examples 1 Through 11 and Comparative Examples 1 Through 11

After performing the arc fusing process according to the above method, the vitreous silica crucible was manufactured by controlling the mold-electrode relative position state by using the mold position setting unit 30 and the electrode position setting unit 20, and performing the arc fusing process accompanied by the fire polishing, under conditions shown in Table 1. Here, the electrode central axis LL and the mold rotation axis ML were in the range from 0° to 60°, and the output was 500 kVA. The distances from each of the two electrodes disposed closer to a target surface (a surface to be fused) are equal in Examples 1 to 11, and are different in Comparative Examples 1 through 11. The electrode disposed farther from the target surface is disposed on a line dividing an angle formed by lines connecting the center of the mold and each of the two electrodes closer to the target surface.

Silicon single crystal was pulled up by using the vitreous silica crucibles manufactured according to Embodiments 1 through 11 and Comparative Examples 1 through 11, and yields (single crystallization rates) of the silicon single crystal was evaluated. The results are shown in Table 1.

Here, the yield (single crystallization rate) of the silicon single crystal is the mass of a straight body portion from which a wafer of silicon single crystal without crystal potential can be collected/the total weight of polysilicon being input to the crucible. When the single crystallization rate differs by 1 wt %, the collectable wafers may differ by about 20 pieces.

In Table 1, $R_{FP}$ is a distance between the target surface and the carbon electrode closest thereto, and SCR is Single Crystallization Rate (%) of Silicon.

TABLE 1

|  | R1A/R (%) | R1B/R (%) | R2/R (%) | $R_{FP}$ (mm) | Aspect Ratio | SCR (%) |
| --- | --- | --- | --- | --- | --- | --- |
| Ex. 1 | 97.4 | 97.4 | 91.3 | 10 | 0.08 | 88 |
| Ex. 2 | 31.6 | 31.6 | 16.7 | 260 | 0.19 | 91 |
| Ex. 3 | 97.4 | 97.4 | 15.5 | 10 | 0.97 | 90 |
| Ex. 4 | 31.6 | 31.6 | 25.5 | 260 | 0.082 | 89 |
| Ex. 5 | 65.8 | 65.8 | 60.0 | 130 | 0.08 | 92 |
| Ex. 6 | 98.9 | 98.9 | 92.8 | 4 | 0.09 | 45 |
| Ex. 7 | 98.9 | 98.9 | 52.3 | 4 | 0.6 | 42 |
| Ex. 8 | 98.7 | 98.7 | 15.7 | 5 | 0.99 | 40 |
| Ex. 9 | 26.3 | 26.3 | 21.2 | 280 | 0.07 | 45 |
| Ex. 10 | 34.2 | 34.2 | 13.1 | 250 | 0.26 | 50 |
| Ex. 11 | 78.9 | 78.9 | 75 | 80 | 0.06 | 38 |
| Comp. Ex. 1 | 97.4 | 95.4 | 91.3 | 10 | 0.08 | 78 |
| Comp. Ex. 2 | 31.6 | 29.6 | 16.7 | 260 | 0.19 | 82 |
| Comp. Ex. 3 | 97.4 | 95.4 | 15.5 | 10 | 0.97 | 83 |
| Comp. Ex. 4 | 31.6 | 29.6 | 25.5 | 260 | 0.082 | 81 |
| Comp. Ex. 5 | 65.8 | 63.8 | 60.0 | 130 | 0.08 | 86 |
| Comp. Ex. 6 | 98.9 | 96.9 | 92.8 | 4 | 0.09 | 41 |
| Comp. Ex. 7 | 98.9 | 96.9 | 52.3 | 4 | 0.6 | 38 |
| Comp. Ex. 8 | 98.7 | 96.7 | 15.7 | 5 | 0.99 | 37 |
| Comp. Ex. 9 | 26.3 | 24.3 | 21.2 | 280 | 0.07 | 40 |
| Comp. Ex. 10 | 34.2 | 32.2 | 13.1 | 250 | 0.26 | 44 |
| Comp. Ex. 11 | 78.9 | 76.9 | 75 | 80 | 0.06 | 33 |

Comparative Examples 1 to 11 are different from Examples 1 to 11 only in that the value of R1B/R (%) is a little smaller in Comparative Examples 1 to 11 than in Examples 1 to 11. According to Table 1, the value of the silicon single crystallization rate in Comparative Examples 1 to 11 is a little lower than that in Examples 1 to 11. This results may be obtained because the two electrode closer to the target surface were not equidistant to the target surface, and thus the fire polishing was a little ununiform.

In Examples 1 to 5, it seems that all conditions are appropriate, and thus arc fusing and fire polishing was performed properly, and therefore high single crystallization rate was obtained.

In Example 6 to 7, it seems that the distance from the electrode to the target surface was too short, and thus the arc flame was applied too strongly to the target surface, and therefore the single crystallization rate was lowered.

In Example 8, the aspect ratio was too large, and thus the interelectrode distance was too large and the arc fusing was not performed properly, and therefore the single crystallization rate was lowered.

In Example 9, the aspect ratio was too small, and thus the interelectrode distance was too small, and the arc fusing was not performed properly, and therefore the single crystallization rate was lowered.

In Example 10, R2/R was too small, and thus the arc fusing was not performed properly, and therefore the single crystallization rate was lowered.

In Example 11, the aspect ratio was too small, and thus the interelectrode distance was too small, and the arc fusing was not performed properly, and therefore the single crystallization rate was lowered.

The present invention is related to a method and apparatus for manufacturing a vitreous silica crucible for pulling up silicon single crystal.

According to the method and apparatus for manufacturing a vitreous silica crucible of the present invention, a vitreous silica crucible having few bubbles or impurities on a crucible inner surface and capable of achieving a high crystallization rate of silicon single crystal can be provided.

| Explanation of Reference Numerals | |
| --- | --- |
| 10: | Mold |
| 11: | Silica powder molded body |
| 13A, 13B, 13C: | Carbon electrode |
| 20: | Electrode position setting unit |
| 30: | Mold position setting unit |
| r1: | Radius |
| K1, K2: | Circular arc |
| K: | Fan-shaped region |
| R1: | Distance from bottom center of silica powder molded body to outer circular arc of fan-shaped region defining position of carbon electrode tip |
| R2: | Distance from bottom center of silica powder molded body to inner circular arc of fan-shaped region defining position of carbon electrode tip |
| θ: | Central angle of fan-shaped region |
| R: | Distance from bottom center of silica powder molded body to inner-circumferential wall |
| D: | Distance between pair of carbon electrodes |
| H: | Height position of pair of carbon electrode tips |
| H2: | Height of silica powder molded body |
| R: | Distance from bottom center of silica powder molded body to inner-circumferential wall |
| θ1: | Relative angle between mold rotation axis of silica powder molded body and central axis of pair of carbon electrodes disposed closer to silica powder molded body |

What is claimed is:

1. A method of manufacturing a vitreous silica crucible by using a rotation molding method that molds silica powder molded body by using raw silica powder in a rotating mold, and heats and fuses the silica powder molded body by using an arc discharge through a plurality of carbon electrodes, the method including: a silica powder supplying process for forming the silica powder molded body having a crucible shape by supplying the raw silica powder inside the mold; and an arc fusing process for fusing the silica powder molded body by using arc flames generated from the plurality of carbon electrodes, wherein the arc fusing process is performed in a state of disposing tips of at least a pair of carbon electrodes of the plurality of carbon electrodes closer to a target surface of the silica powder molded body than is/are the other carbon electrode tip(s), and setting distances from each of the tips of the closer carbon electrodes to the target surface, to be equal, and the arc fusing process is performed by heating and fusing the silica powder molded body, and then, fire polishing is performed to partially remove an inner surface and to reduce thickness of the silica powder molded body by using arc flames generated by the closer carbon electrodes, wherein the fire polishing is performed in a state of disposing all carbon electrode tips inside an imaginary truncated circular sector defined, as viewed from above, by lines connecting a bottom center of the silica powder molded body and each of the tips of the closer carbon electrodes, a circular arc that passes through the tips of the closer carbon electrodes, and a circular arc that passes through a tip of an innermost carbon electrode, wherein relationships of R1/R=90% to 98%, R2/R=15% to 20%, and aspect ratio indicated by D/R1=0.80 to 0.97 are satisfied, wherein R1 is a distance from the bottom center of the silica powder molded body to an outer circular arc of the imaginary truncated circular sector, R2 is a distance from the bottom center of the silica powder molded body to an inner circular arc of the imaginary truncated circular sector, R is a distance from the bottom center to an inner-circumferential wall of the silica powder molded body, and D is an interelectrode distance of the closer carbon electrodes.

2. The method of claim 1, wherein relationships of H/H2=1% to 130% and θ1=2° to 60° are satisfied, wherein H is a height direction distance of the tips of the closer carbon electrodes in a central axial direction of the silica powder molded body, θ1 is a relative angle between a mold rotation axis of the silica powder molded body and the central axis of the closer carbon electrodes, H2 is a height of the silica powder molded body, and R is a distance from a bottom center of the silica powder molded body to an inner-circumferential wall.

3. The method of claim 1, wherein a relative angle between the central axis of each of the closer carbon electrodes with respect to the mold rotation axis is set in a range from 0 to 60°.

4. The method of claim 1, wherein a distance between the tips of the closer carbon electrodes and the target surface is in a range from 5 to 260 mm.

* * * * *